L. DREW.

BAKERS FOR HEATING-STOVES.

No. 7,869. Reissued Sept. 4, 1877.

WITNESSES:

H. Rydquist

Alex F. Roberts

INVENTOR:

Luna Drew

BY Munn & Co

ATTORNEYS.

N. PETERS, PHOTO-LITHOGRAPHER, WASHINGTON, D. C.

UNITED STATES PATENT OFFICE.

LUNA DREW, OF IRVING, WISCONSIN.

IMPROVEMENT IN BAKERS FOR HEATING-STOVES.

Specification forming part of Letters Patent No. 191,035, dated May 22, 1877; Reissue No. 7,869, dated September 4, 1877; application filed July 23, 1877.

*To all whom it may concern:*

Figure 2:
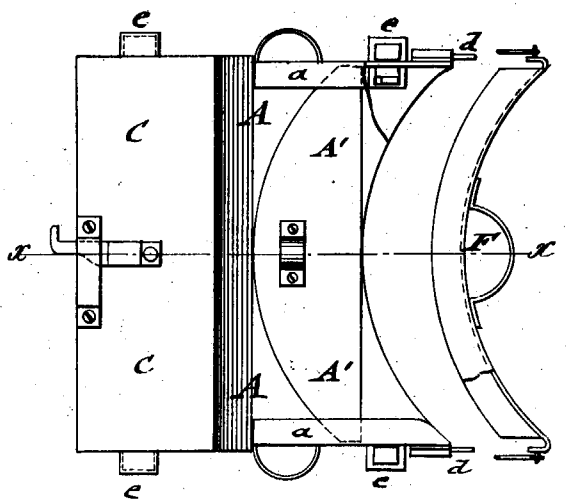
Figure 1:
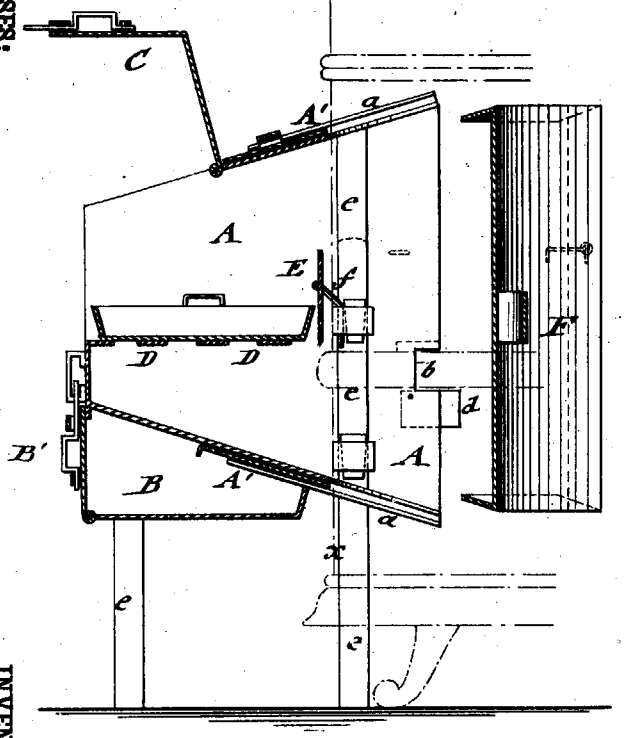

Be it known that I, LUNA DREW, of Irving, in the county of Jackson and State of Wisconsin, have invented a new and Improved Baker, of which the following is a specification:

In the accompanying drawings, Figure 1 represents a vertical transverse section of my improved baker on line *x x*, Fig. 2; and Fig. 2, a top view of the same.

Similar letters of reference indicate corresponding parts.

The invention relates to an improved baking attachment to heating-stoves of all kinds, so that the heat of the latter may be utilized for baking, warming, raising bread, and other purposes; and the invention consists of a baker supported on adjustable legs, and secured to a round, oval, or square heating-stove by suitable top and bottom slides.

A warmer is arranged below the baker, and a detachable deflecting-plate is located between the baking-dish and stove.

The front of the baker is made detachable, and when the same is removed, and the baker is attached to a stove, heat is radiated directly into the interior of the oven.

In the drawing, A represents a baker that is intended to be used as an attachment to the common heating-stoves of round, square, or oval shape.

The side walls are for being adjusted to any shape of stove, extended beyond the segmentally recessed and inclined top and bottom walls, and the top and bottom provided with slide-pieces A′ that are moved forward or backward in suitable guides *a*, for the purpose of fitting the baker to any size or shape of stove, as required. The side walls are notched to fit the rim of the stove, if there should be one, the notches *b* being closed by pivoted pieces *d* in case there is no rim.

The baker A is supported on adjustable front and hind legs *e*, by which it may be set to any height to fit the stove, the legs sliding in guide-bands and being secured by clamp-screws or wedges, or other fastening devices.

A warmer, B, is arranged below the bottom of the baker and closed at the rear by a hinged door, B′, that is locked in suitable manner. The warmer B serves for the purpose of warming plates, pies, and other articles, and forms a very convenient feature of the baker.

The baker A is closed at the upper rear part with a door, C, that is hinged to the top, as shown in Fig. 1, and closed in suitable manner. It is provided with a grate, D, on which the different dishes, pans, and plates are placed for baking. The heat from the stove is thrown, by the inclined top and bottom walls, on the articles, so as to fully bake the same.

A deflecting-plate, E, is supported in vertical position between the baking-dish and the stove, to prevent the direct heat from burning that side of the article while baking. The plate is held by means of side arms or brackets *f*, whose bent ends are passed down between the upper guide-bands of the legs *e* and the fastening-wedges.

If the deflecting-plate is not used, the side of a loaf of bread or other article nearest the stove would be burned before the rest of the loaf was sufficiently baked; but by the deflecting-plate the side is protected from the direct heat, and both sides, as well as top and bottom, baked alike. This plate is mainly used for lighter articles, such as bread, biscuits, puddings, or pies; but for potatoes, beans, or other articles inclosed in tightly-covered dishes, the same may be removed.

The rear door of the baker is not opened to prevent too hard baking, but the entire baker preferably moved back a small distance from the stove, so as to regulate thereby the baking process.

The front part of the baker facing the stove is closed by a segmental, but detachable, cover, F, that is fitted, by the top, side, and bottom flanges, to the baker, and secured, by hooks and eyes, or otherwise, to the side walls of the same. The front cover F is taken off when the baker is used for baking, but is applied, after use, to make the baker available for raising bread, and for keeping any article warm, and protected against dust and flies.

The baking attachment to common heating-stoves can be used for baking all kinds of articles, frying meats, &c., in a convenient and satisfactory manner, utilizing the same fire by which the room is heated, the baker being readily detached and used for storing articles when not required as a baker, and forming an economical and useful device that may be fitted to any size and shape of parlor-stove without the least inconvenience.

Having thus described my invention, I claim as new and desire to secure by Letters Patent—

1. The detachable deflector, having side arms for attaching it to the legs or guide-bands of the baker, as and for the purpose specified.

2. The detachable cover F, fitted by top, side, and bottom flanges to the baker, substantially as and for the purpose specified.

LUNA DREW.

Witnesses:
ISAAC DREW,
LOREN W. DREW.